Dec. 17, 1935.  W. G. GREEN  2,024,921
METHOD OF DETERMINING SLOPE OF SUBSURFACE ROCK BEDS
Filed Nov. 14, 1932  3 Sheets-Sheet 1
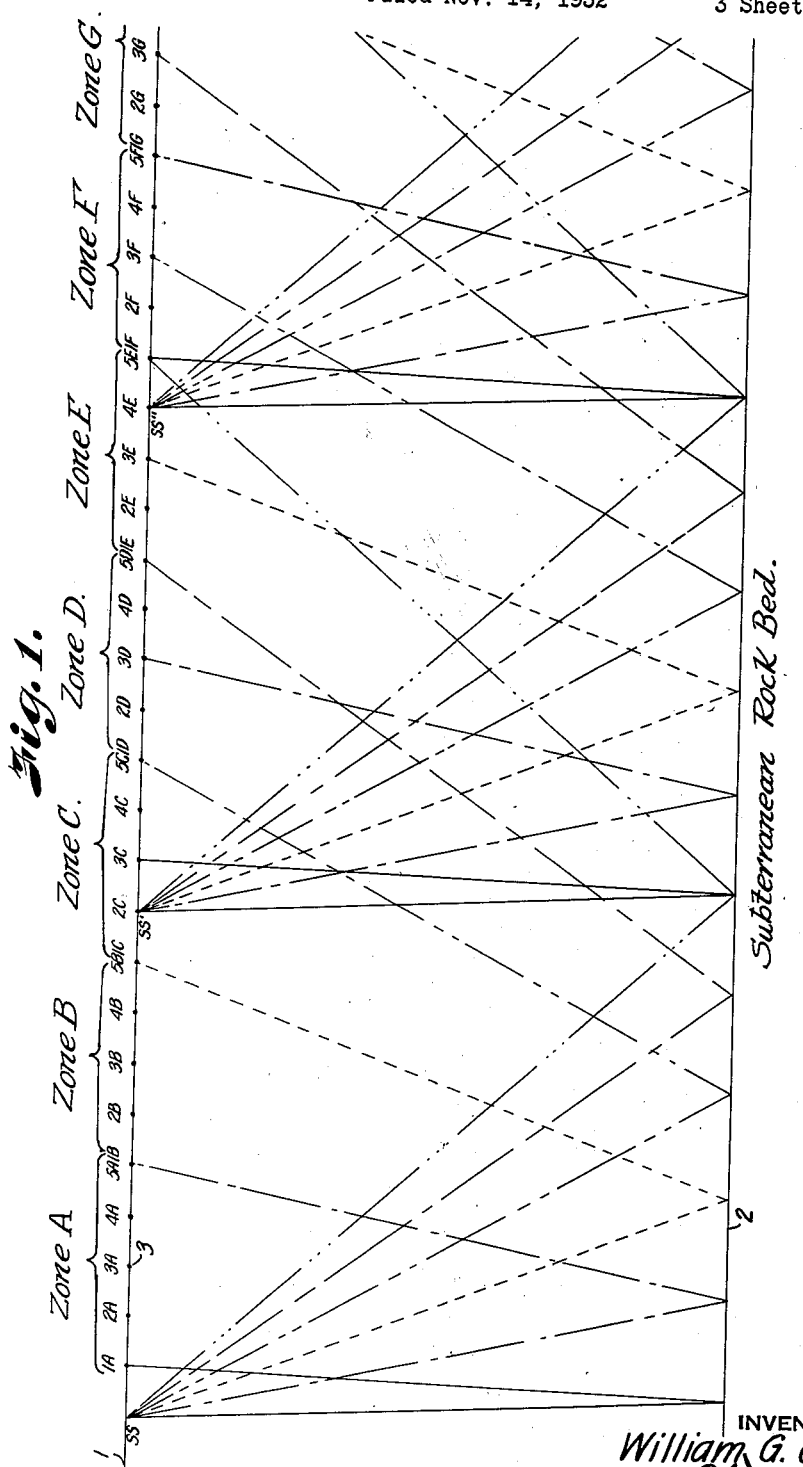
INVENTOR
William G. Green
BY
ATTORNEY

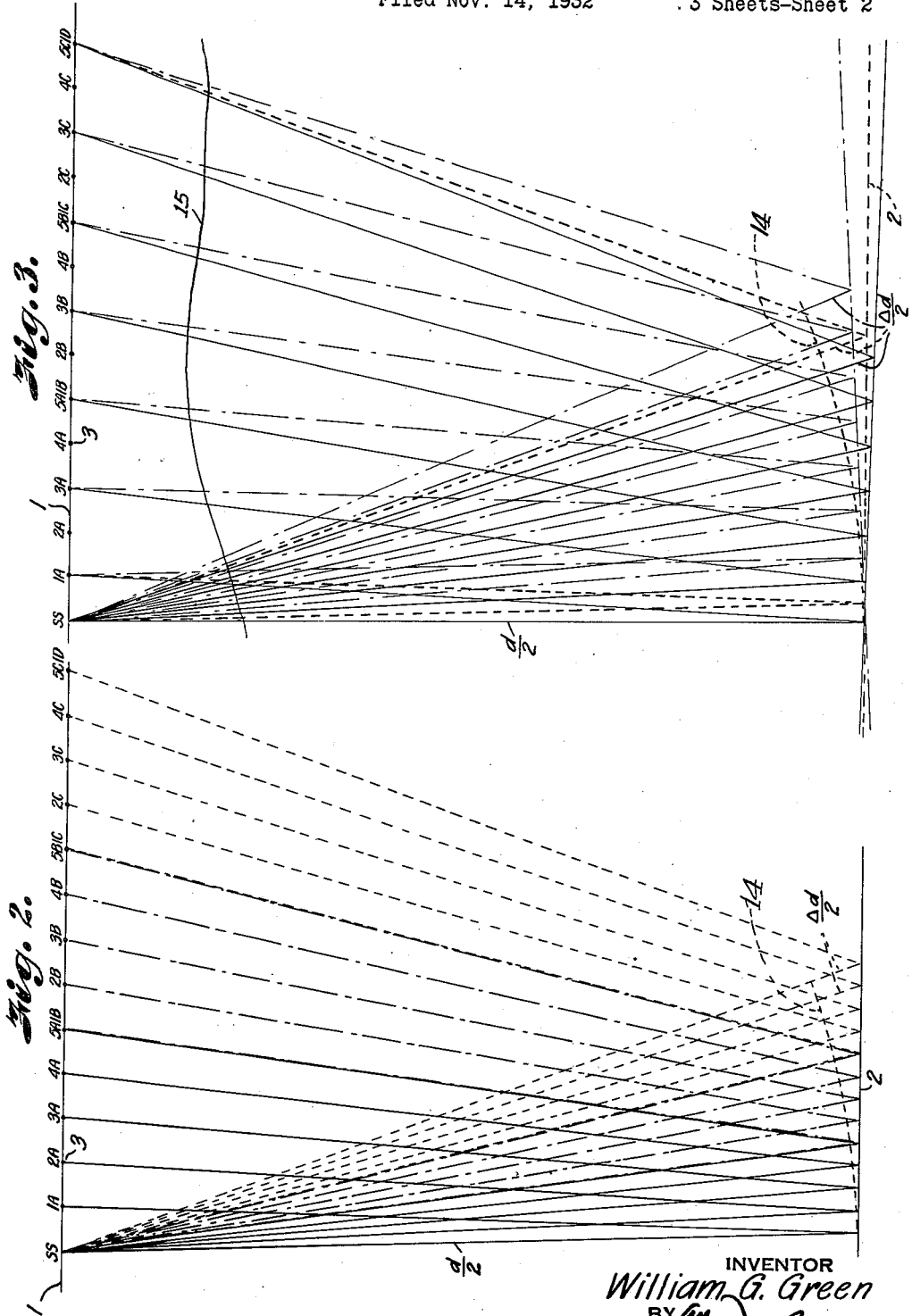

Patented Dec. 17, 1935

2,024,921

UNITED STATES PATENT OFFICE 2,024,921

METHOD OF DETERMINING SLOPE OF SUBSURFACE ROCK BEDS

William G. Green, Tulsa, Okla.

Application November 14, 1932, Serial No. 642,561

8 Claims. (Cl. 181—0.5)

My invention relates to the art of surveying subterranean areas from the surface of the earth for locating formations indicating the presence of oil and more particularly to a method for determining slope of subsurface rock beds.

In attempts to find the approximate contours of subterranean strata and the depth at which these formations are located, methods are commonly followed requiring the use of instruments such as seismographs for detecting sound waves, sent out by detonation of a shot on or near the earth's surface and reflected back by subterranean formations, and oscillographs for recording the amplitude of the waves. With one exception all of the methods practiced in the above manner, of which I am aware, depend on the correlation of records obtained from several different points, the correlated records indicating the difference in slope of a bed at different points. If the records are correctly correlated the computation of slope therefrom is a relatively simple matter. However, it is often extremely difficult because of interfering waves and lack of clarity of the records for various reasons to accurately and positively correlate the reflection impulses and the drilling of numerous wells at great expense has proved that the conclusions arrived at by the above method are frequently unreliable.

The single exception referred to above is a method used in low velocity material where a difference in time between the first and last recording instruments on one set-up of instruments is used to determine the slope of the subsurface bed between two depth points corresponding to these instruments. In following this method, the usual practice is to space four seismograph detectors at regular intervals, as for example, every 200 feet, in a straight line from a shot point or source of sound (S. S.). Thus, the four consecutive instruments would be respectively spaced 200, 400, 600 and 800 feet from the sound source. From well known laws the depth determined by the record obtained from the first instrument (200 feet from S. S.) would be that of a vertical line extending downwardly from a point half way between the S. S. and first instrument to the reflecting horizon or rock bed. The depth point determined by a record from the last instrument (800 feet from S. S.) would accordingly be 400 feet horizontally from the source of sound, considering the subsurface to be level. Consequently, the actual horizontal length of subsurface area surveyed by this method when a single S. S. and four detectors spaced at 200 feet intervals are used would be the difference between 100 and 400 feet or 300 feet. In localities such as the American Gulf Coastal area where the subsurface velocities are comparatively low or approximately 9,000 feet per second, the latter method is very suitable particularly in view of the fact that the inclination of slopes around salt domes of this area is comparatively great.

However, in the Mid-Continent area of the United States the velocities at which sound waves traverse the earth are from 10,100 to 11,000 feet per second and the slopes usually incline only from 0 to 40 feet per 1,000 feet of horizontal length of a subsurface stratum. It will thus be evident that the latter method is unreliable for use in high velocity material since the difference in time noted between the first and last instruments would be so small as to make an accurate selection and reading of the records extremely difficult and often impossible.

It is the principal object of my invention therefore, to eliminate the confusion incident to practicing the foregoing methods and to provide a method whereby slope of subsurface rocks beds can be more positively and accurately determined.

This object I accomplish primarily by surveying as great a continuous length of the reflecting horizon as required for definitely indicating the contour profile of the rock bed and have illustrated steps and results of this method in the accompanying drawings, wherein:

Fig. 1 is a diagrammatic view illustrating the successive positioning of detectors and sound sources for surveying an extended area of a rock bed.

Fig. 2 is a diagrammatic view showing three consecutive positions of a group of five seismographs for detecting sound waves originating from a single shot point.

Fig. 3 is a similar view showing the relative decrease and increase in distances travelled by sound waves reflected respectively from inclined and declined reflecting horizons.

Figure 4:
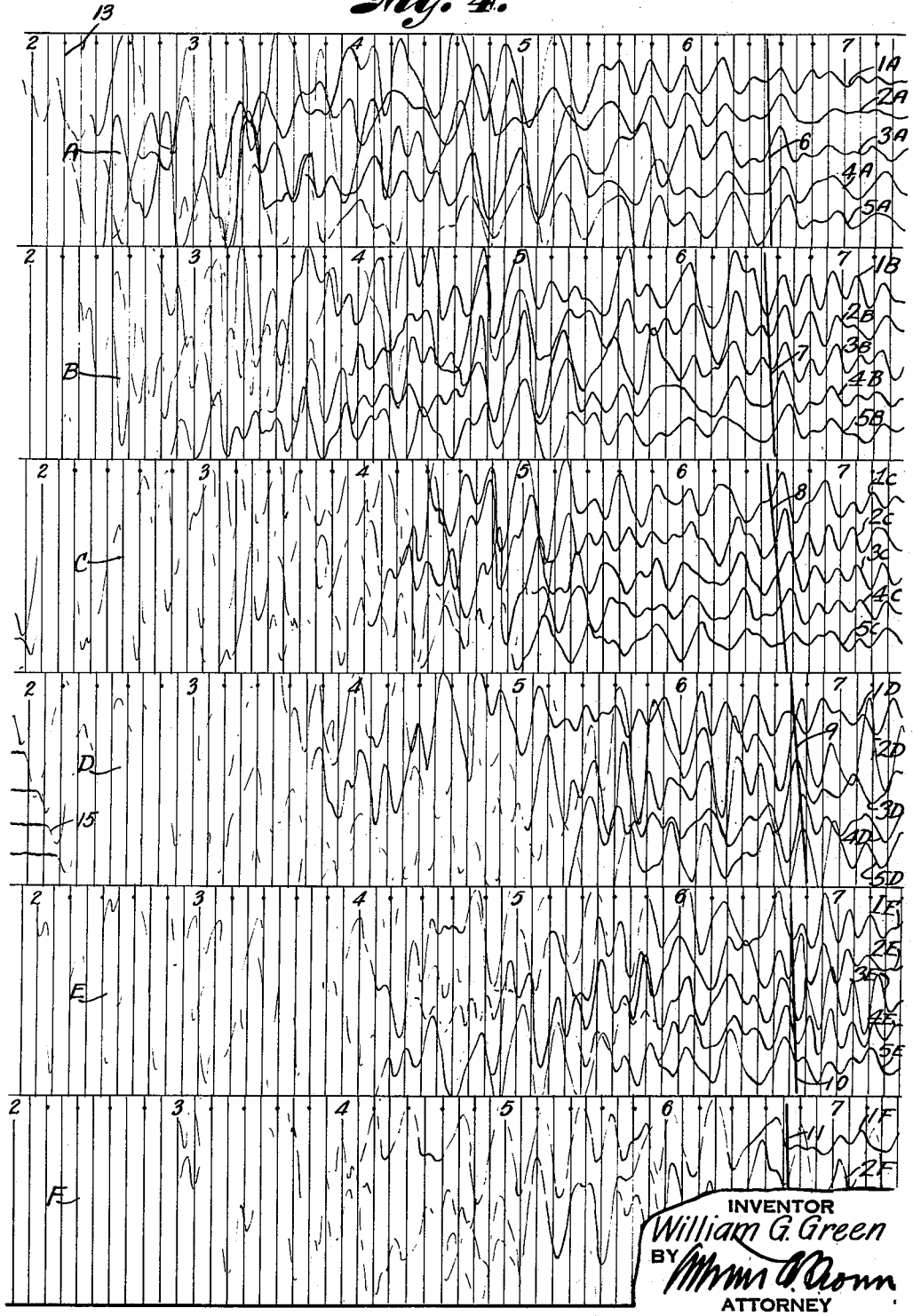
Fig. 4 is a copy of a set of correlated records obtained by following my improved method.

Referring more in detail to the drawings:

The lines 1 and 2 respectively designate the earth's surface and the surface of a subterranean rock bed. A sound source or shot point, usually comprising a charge of dynamite, is designated by SS and seismograph detectors are indicated by the numeral 3. The arrangement and equal spacing of the detectors in a line with the SS is particularly illustrated in Fig. 2 wherein the full lines indicate sound waves emanating from a source of sound and reflected back by the horizon of the rock bed to the group of detectors located in a zone "A" at stations designated 1A to 5A.

The resulting reflections detected by the five seismographs are recorded on a single film strip in the manner indicated on the uppermost strip "A" of Fig. 4 of the drawings. As above referred to, it will be noted, however, that if the detector at station 5A is located 1,000 feet from SS, the point where the sound wave reaching this detector strikes the rock bed is only 500 feet horizontally from SS or half way between SS and 5A. Similarly, the reflecting point of the wave reaching the detector at station 1A is 100 feet horizontally from SS so that the total length surveyed of the rock bed surface by the group of five detectors is only 400 feet. The records made at the respective stations 1A—2A—3A—4A, and 5A are correspondingly designated in Fig. 4.

Assuming that the surface of the bed inclined 10 feet to every 1,000 feet of horizontal length it will be readily evident that the 4 foot rise in the length surveyed would result in such a small difference in the time of arrival of the waves at the first and last detectors from the normal time of arrival if the surface were level that the records would be of little or no value since it would be impossible to make accurate computations therefrom.

Upon obtaining the first record I, therefore, move the five detectors respectively to a zone "B" including the five stations indicated at 1B to 5B, the station 1B being identical with the station 5A so that the last record on one film will be as nearly like the first record of the next film as is possible.

Another shot is then detonated at SS and the resulting waves, indicated by the dot and dash lines in Fig. 2 are recorded by the group of five detectors at their stations in zone "B". The film "B" thus obtained is correlated with and mounted adjacent the first film "A" as in Fig. 4. This is readily accomplished by comparing the trace 5A on film "A" with the trace 1B on film "B". Since they were made at the same station and from the same shot point SS they would be substantially alike although they may vary slightly in intensity due to the fact that the detector was previously moved from 1A to 1B so that differences in ground contact or possibly differences in depth of the holes in which the detector was planted may have affected the character of the traces. However the counted vibrations are the same. The actual distance surveyed on the rock bed surface has now been increased to 800 feet and by repeating the foregoing steps and moving the detectors to stations 1C to 5C in zone "C" so that the sound waves indicated by dotted lines (Fig. 2) are recorded at this location, the surveyed distance is further increased to 1,200 feet.

Considering the inclination of the slope to have continued at the rate of 10 feet per 1,000 feet the last depth point recorded would be only 12 feet nearer the earth's surface than the first recorded depth point, an elevational difference so small that accurate computations from the records thus far obtained would probably be impossible. The groups of detectors are, therefore, successively moved to stations 1D to 5D in zone "D" and 1E to 5E in zone "E" (Fig. 1) and the previously described steps repeated for obtaining record films "D" and "E". This process may be continued indefinitely or until the angle of incidence to the subsurface rock bed increases to the critical angle of refraction. It is, therefore, possible to survey from one shot point a distance on the rock bed approximately equal to the depth of the bed below the surface of the earth.

In order to carry the steps of surveying still further it now becomes necessary to move the SS to the point SS' (Fig. 1) and it should be noted that this point is so arranged in a straight line with the previous detector stations that the waves from the first detonated shot at the new sound source and picked up by the first detector or 3C adjacent this source strikes the rock bed at the identical point where the last recorded wave from SS struck the bed thereby producing a record as nearly as possible like the last record theretofore obtained.

Thereupon the process of obtaining records may be continued by consecutively moving the seismographs to stations 1D to 5D, 1E to 5E and, after it becomes impossible, because of too great an angle of incidence, to any longer obtain reflections of waves emanating from the point SS', the source of sound is moved to the next station or SS" (Fig. 1) and the group of detectors is successively placed at stations 1F to 5F and so on. The resulting records are finally arranged in proper correlation in much the same manner as shown in Fig. 4 and lines 6, 7, 8, 9, 10, and 11 may be drawn across consecutive groups of records to follow a particular reflecting surface indicated by the traces. It will, of course, be evident that all of the recording stations and the points of sound source should be arranged in a straight line so that the contour of the rock bed surface is surveyed along a correspondingly straight line.

As will be noted from the copy of an actual record (Fig. 4) the first portions of the traces are frequently indefinite due to the excessive initial amplitude of the waves but the latter portions are clear and by having a number of records showing the results of surveying an extensive area it is possible to determine with accuracy the general slope of a subsurface rock bed.

The procedure of calculating the depths of a bed from records divided by transverse lines 13 into equal time intervals is well known to those skilled in the art. For computation purposes it is desirable to assume the rock bed to be level as shown in Fig. 2, and it will be clear from this figure that the depth obtained from the first instrument reflection at station 1A is approximately one-half the distance from SS to the rock bed and back to the deflector at this station or $d/2$. Since the record of the reflecting wave takes nothing into account except the time consumed in traversing the path from SS to the rock bed and back to station 1A, $d$ is recorded as a function of the time "T" of the reflection.

By taking the station SS as a center and swinging an arc 14 from the rock bed it is found that the length of path traversed by the waves increases in proportion to the spacing of the detectors from the sound source. Thus the increase in the path $d/2$ as the distance of the detector from SS increases is designated delta $d/2$ which represents a delta time, or normal delta T for the level subsurface assumed. This normal delta T increases as the surface of a rock bed declines, and increases in proportion to the inclination of the surface as illustrated in Fig. 3.

If, on computing the recorded reflections of an instrument set-up a delta time is observed which differs from the expected delta T, this difference, after correcting for elevations, weathering, etc., would be due to the difference in time required for the waves to travel their paths and would designate the slope of the bed. Therefore, the difference between the normal expected delta T and the observed delta T for any particular distance from the S. S. will be the result of a slope in the surveyed portion of the surface of the rock bed.

For the purposes of simplifying and expediting the computation of records obtained by the method above described a graphical solution has been worked out whereby the amount and direction of a slope may be accurately ascertained. Formulas showing the relation of the various quantities may also be derived to simplify the process of calculating the amount of slope.

Calculation of the slope of a subsurface bed from a record as shown in Fig. 4 is thus comparatively simple. However, because the relatively loose or unconsolidated layer of "weathered" material extending downwardly from the surface of the earth at varying distances transmits sound at a very low velocity it is necessary to first find the base of this layer, designated 15, Fig. 3, and to thereafter make the necessary corrections on the records so that the final calculation will be as nearly accurate as possible. The depth of the weathered layer at each detector station may be determined by any well known method.

In practice I compute this depth by the refraction method from the first arrival time of the records, this time being indicated by a sudden break in a trace near its beginning as shown at 15 on the fourth record strip of Fig. 4. The indication, in the trace, of the exact instant at which the shot was detonated would be to the left of the break 15 and is not shown in this figure.

From the foregoing it will be apparent that in practicing the present invention, a positive correlation of various records and an accurate and reliable calculation of depths is made possible. Since the difference in depth from one point to another can be accurately determined and this process continued indefinitely it is possible with my method to obtain a complete profile of the surveyed slope of a subsurface rock bed.

In order to check the computations made on the records obtained by the process above described the same procedure may be followed but in the reverse direction, thus producing an effect opposite to the former, i. e., an incline indicated by the latter should correspond to a decline disclosed by the former procedure and vice versa.

What I claim and desire to secure by Letters Patent is:

1. The method of profiling a subsurface formation including detonating an explosive charge at one point, recording the reflection of sound waves set up by the detonation and reflected from said formation at a series of spaced detecting points, advancing such series of detecting points in definite relation to the first series of detecting points so that the first one of the detecting points of the second series is common to a detecting point of the first series, detonating a second explosive charge at said first point of detonation, recording the sound waves set up by the second detonation and reflected from said formation to said second series of detecting points, and correlating said records relatively to recordings from said common detecting points wherefrom a continuous profile of said formation is determined.

2. The method of profiling a subsurface formation including generating sound waves at a point above said formation, recording reception of said waves reflected from said formation at a point spaced from said generating point to determine a point of incidence of said waves with said formation, generating similar waves at a point spaced from said first generating point and in definite relation to said recording point, and recording reception of the waves reflected from said formation at the first point of incidence by a different path to provide a plurality of records whereby profile of said formation is determined by correlation of said records.

3. The method of profiling a subsurface formation including generating sound waves at a point above said formation, recording reception of said waves reflected from said formation at a plurality of aligned points spaced from said generating point to determine points of incidence of said waves with said formation, generating similar waves at a point spaced from said first generating point and common to one of said points of reception, and recording reception of the waves reflected from said formation at a plurality of spaced points from the second generating point, the first of which being waves reflected through the last point of incidence by a different path to provide a plurality of records whereby a continuous profile of said formation is determined by correlation of said records.

4. The method of profiling a subsurface formation including progressively producing at spaced sources successive sets of seismic waves, and recording reception of the sets of waves reflected from said formation at such regularly spaced distance relation to effect reception of one set of reflected waves from one source through an incidence point on the formation common to the incidence point of a recorded set of reflected waves from an adjacent source.

5. The method of profiling a subsurface formation including producing sets of sound waves at a common source above said formation, recording reception of the sets of waves reflected from progressively spaced incidence points on said formation and to the approach of a point producing a critical incidence angle, producing similar sets of sound waves at a point common to one of said recording points, and recording reception of the sets of waves reflected by the formation from said second source to establish a series of records each having a recording common to a recording on another whereby the records are correlated to determine profile of said formation.

6. The method of profiling a subsurface formation including producing sets of sound waves at a source above said formation, recording reception of the sets of waves reflected from progressively spaced incidence points on said formation and to the approach of a point producing a critical incidence angle, producing similar sets of sound waves at a source spaced from said first source and common to one of said points of reception, and recording reception of the sets of waves reflected by the formation from said second source in such spaced distance relation to effect reception of one set of reflected waves from the second source through an incidence point on the formation common to an incidence point of a reflected wave recorded from the first source.

7. The method of profiling a subsurface formation including detonating an explosive charge at one point, recording the reflection of sound waves set up by the detonation and reflected from said formation at a series of spaced detecting points, progressively advancing said series of detecting points in definite relation to the preceding series of detecting points so that one of the detecting points of a succeeding series is common to a detecting point of the preceding series, detonating an explosive charge at said first point of detonation for each series of detecting points to provide a plurality of records each having a recording common to a recording from a preceding record, and correlating said records relatively to said common recordings wherefrom a continuous profile of said formation is determined.

8. The method of profiling a subsurface formation including generating sound waves at a point above said formation, recording reception of said sound waves reflected from said formation at a plurality of spaced points, generating a similar set of waves at the point of reception of one of said reflected waves from the first generating point, and recording reception of the waves reflected by the formation from said second generating point at a plurality of spaced points including one of the first points of reception to provide a plurality of records each having a recording common to a recording on a preceding record wherefrom a continuous profile of said formation is determined by correlation of said records.

WILLIAM G. GREEN.